Oct. 14, 1958 F. C. BEILFUSS 2,856,461

AUTOMATIC CALL SYSTEM

Filed Sept. 24, 1956 3 Sheets-Sheet 1

Inventor
Freeman C. Beilfuss
By Harold O. Van Antwerp
Attorney

Inventor
Freeman C. Beilfuss
By Harold O. Van Antwerp
Attorney.

Inventor
Freeman C. Beilfuss
By Harold O. Van Antwerp
Attorney

United States Patent Office 2,856,461

Patented Oct. 14, 1958

2,856,461

AUTOMATIC CALL SYSTEM

Freeman C. Beilfuss, Grand Rapids, Mich.

Application September 24, 1956, Serial No. 611,588

9 Claims. (Cl. 179—84)

This invention relates to an automatic call system which is for the purpose of actuating one or more signals at remote stations at predetermined times. It is particularly intended to be used in cooperation with a conventional telephone system in such places as hotels and office suites in which there is a central switch board and a telephone in each of the respective rooms, this automatic call system being adapted to close the telephone bell circuit in any of the selected rooms at predetermined times, lifting of the telephone receiver acting to instantly disconnect the bell circuit and restore the telephone system to normal operating condition.

This call system can be used with any conventional telephone system without special equipment or alteration and does not at any time interfere with the normal operation of the telephone.

Figure 1:
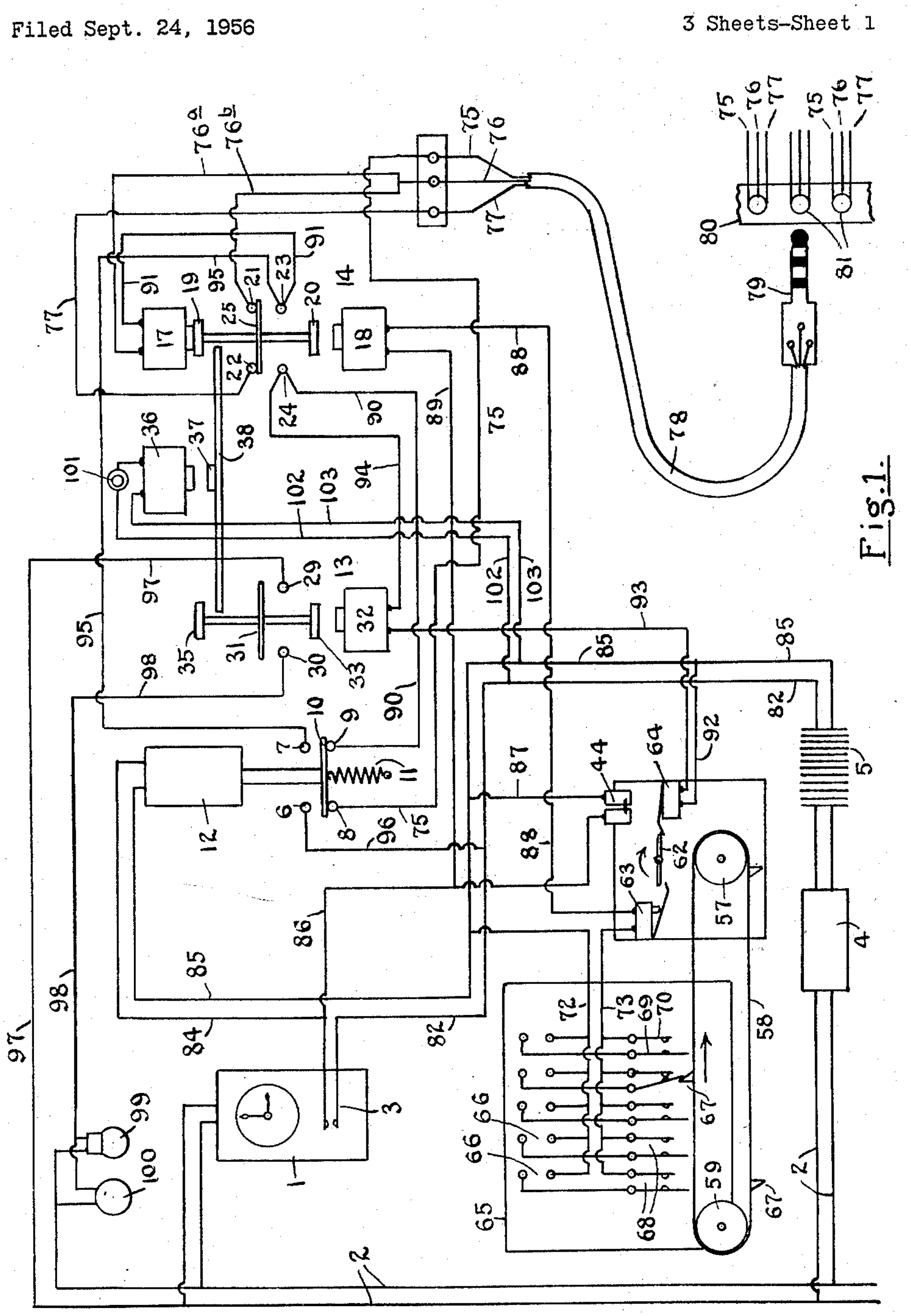
Figure 2:
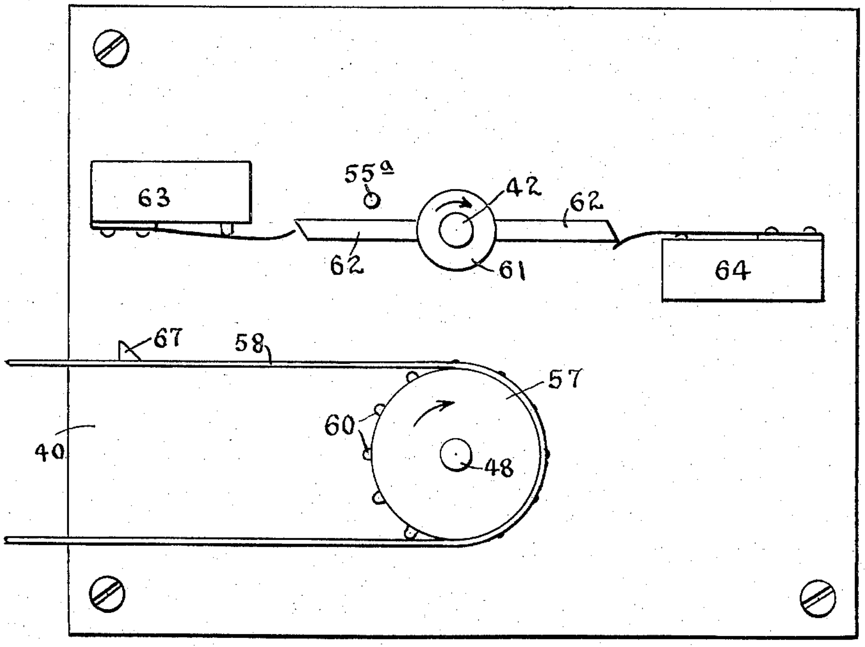
Figure 3:
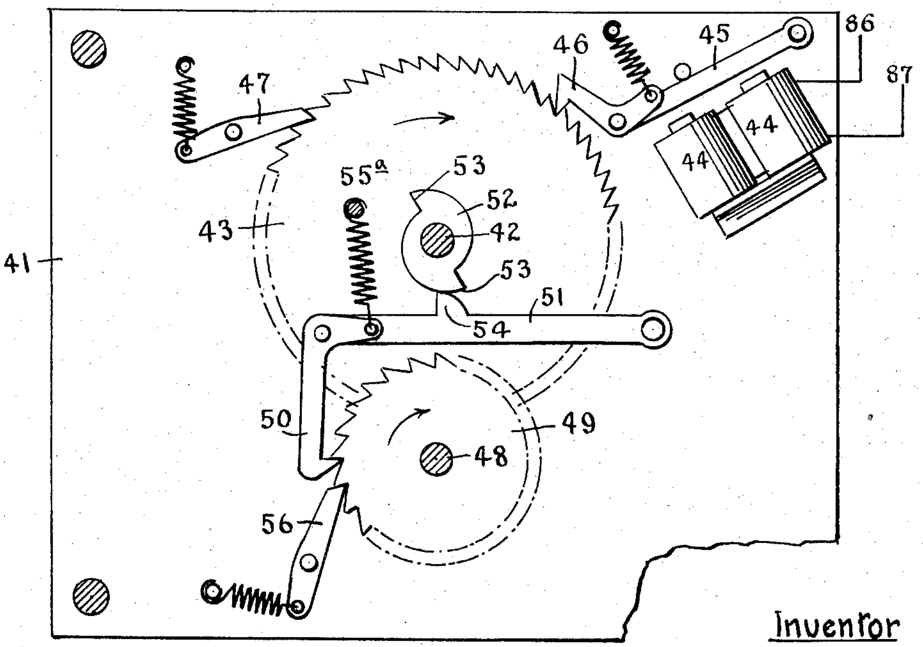
Figure 4:
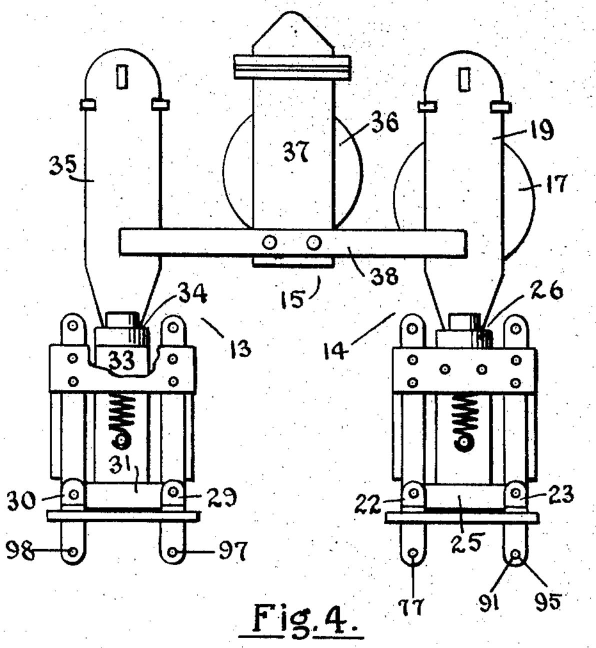
Figure 5:
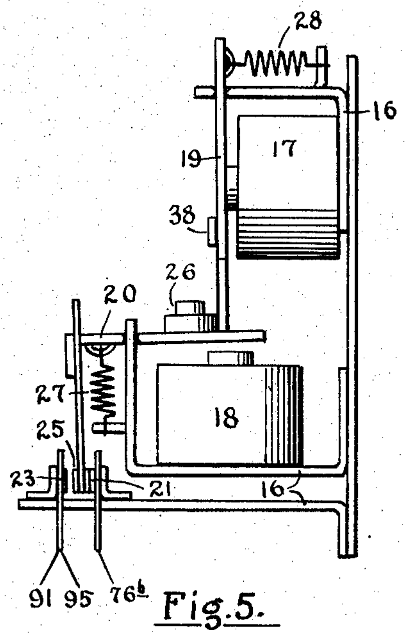
Figure 7:
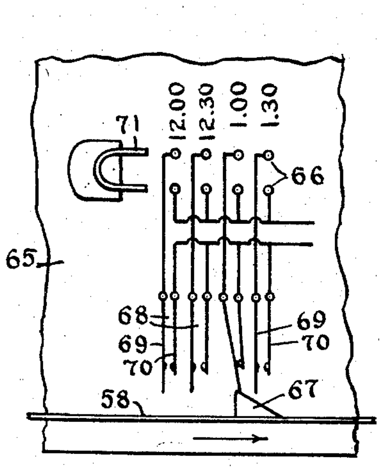
Figure 6:
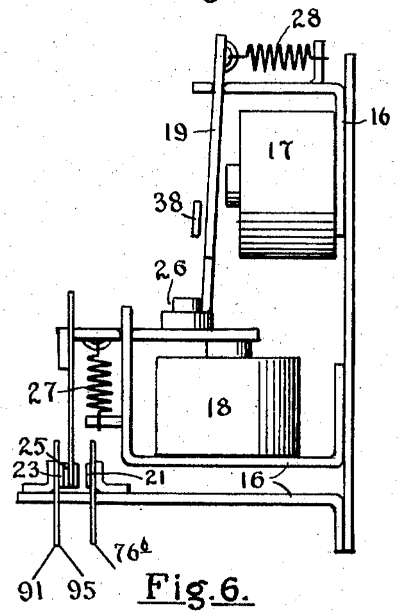

The invention provides various new and useful features of construction and arrangement hereafter more fully described, reference being had to the accompanying drawings, in which Fig. 1 is a diagram of the complete call system, Fig. 2 is a plan view of a part of the program mechanism showing two micro switches and a part of the program tape and operating drum, Fig. 3 is a plan view of the lower part of the program mechanism showing the means for operating the main shaft and program tape drum, Fig. 4 is an elevation of the latch relay switch unit, Fig. 5 is a side elevation of one of the latch relay switches shown in one of its positions, Fig. 6 shows the same switch as Fig. 5 in its other position, and Fig. 7 is a diagram of a part of the program circuit closer.

Like reference numbers apply to like parts in all of the figures.

The master clock 1 is a conventional clock, preferably run by electricity from an outside source such as an ordinary 110 volt lighting circuit 2. The clock has a circuit closer 3 operated momentarily at one minute intervals to close the electric circuit of the call system. This call system current may be in the nature of 24 volt D. C. which is obtained from the 110 v. A. C. line 2 through a transformer 4 and a rectifier 5.

A so called safety switch has four contact points 6, 7, 8, and 9 in pairs and a switch blade 10 connects the two of either pair when moved to one position by a spring 11 or to the other position by a magnet 12.

The latch relay switch unit has two latch relay switches 13 and 14 and a throw out magnet 15. The switch 14 (Figs. 4, 5, 6) has a frame 16 on which are mounted an upper magnet 17 and a lower magnet 18. Each of the magnets has an armature 19 and 20 pivotally mounted on the frame. Four contact points 21, 22, 23 and 24 are mounted on the frame in pairs and a blade 25 will connect the two contacts of either pair when moved to either of its two positions, the blade 25 being attached to the lower armature 20 and moved thereby.

The upper surface of the armature 20 has a step 26 which is engaged by the lower end of the upper armature 19. In the position of Fig. 5 the armature 19 has been attracted by the magnet 17 and its rear end has been elevated by the spring 27 so that the lower end of the armature 19 rides against the step 26 holding it there against tension of its spring 28. When the lower magnet 18 becomes energized it will pull the armature 20 downward against tension of the spring 27 (Fig. 6) and the end of the armature 19 will ride on top of the step 26 by action of its spring 28 where it will remain until the armature is released from the step.

The latch relay switch 13 is the same as the one 14 above described excepting that it does not have the upper magnet 17 and has only 2 contact points 29—30 closed by a blade 31. The magnet 32 attracts the armature 33 which moves the blade 31. The armature 33 has its latching step 34 which is engaged by its upper armature 35, rearward movement of which releases the armature 33.

The throw out magnet 15 located between the switches 13 and 14 has a magnet 36 and a pivoted armature 37 to which is attached a cross bar 38 which at its opposite ends overlaps the armatures 19 and 35 and which, when moved by attraction of the magnet 36, swings both armatures off the respective steps 26 and 34 releasing both lower armatures 20 and 33 for the purpose of disconnecting a light and buzzer hereafter described.

The program mechanism of Figs. 2 and 3 is in two parts located one above the other with that of Fig. 2 uppermost. Each part has a base plate, 40 for Fig. 2 and 41 for Fig. 3. A vertical main shaft 42 extends through and is journaled in both base plates and above the base plate 41 (Fig. 3) a ratchet toothed disk 43 is attached to the shaft. A magnet 44 has a pivoted armature 45 on the free end of which is mounted a pawl 46. The pawl engages the teeth on the disk 43 and rotates the disk the distance of one tooth each time the armature is attracted by the magnet 44. A holding pawl 47 mounted on the plate 41 also engages the teeth of the disk 43 and prevents reverse movement thereof.

As shown the disk 43 has 60 ratchet teeth so that the magnet 44 energized each minute by current controlled by the master clock will rotate the disk 43 once each hours. This number of teeth and the time of rotation of the disk 43 and shaft 42 may be altered if desired.

A second vertical shaft 48 extends through and is journaled in both base plates 40 and 41 adjacent the periphery of the disk 43. This shaft 48 is used to cause a step by step movement of the tape which periodically operates certain circuit closers of the program device hereafter described.

A ratchet disk 49 is attached to the shaft 48. A pawl 50 engages the teeth of the disk 49 and is mounted on the free end of a lever 51 pivotally mounted on the base plate 41. A cam 52 is attached to the shaft 42 and has two diametrically opposite risers 53 and a rider 54 on the lever 51 rides on the periphery of the cam 52 being held against it by the spring 55 which also holds the pawl 50 against the teeth of the ratchet disk 49. The upper end of the spring is attached to a pin $55^a$ which projects downwardly from the upper plate 40.

As the cam 52 rotates one step each minute the rider 54 will gradually ride up on one of the risers 53 causing the pawl 50 to move over the teeth of the disk 49 until it meshes with one of said teeth and as the rider 54 reaches the end of a riser 53, it will drop off the riser so that the spring 55 can pull the lever 51 and pawl 50 to rotate the shaft 48 one step of its rotation. As shown, the cam 52 has two risers so that during each hourly rotation of the shaft 42 the shaft 48 is rotated one step each half hour. More or less cam risers may be used to vary the timing of the program device. A holding pawl

56 pivoted to the base plate 41 engages the teeth of the disk 49 to prevent reverse rotation thereof.

Above the plate 40 a drum 57 is attached to the shaft 48 and the program tape 58, which is in the nature of an endless belt, passes around this drum and another idler drum 59 spaced therefrom. The drum 59 may be provided with teeth 60 to avoid slippage and as the drum 57 rotates step by step each half hour it imparts to the tape 58 a like step by step movement.

Above the plate 40 a hub 61 is fixed to the shaft 42, the hub having two oppositely radially extending arms 62. Two micro switches are mounted on the plate 40 on opposite sides of the shaft 42 and each is operated by one of the arms 62 to close an electric circuit through it at half hour intervals or twice during each rotation of the shaft 42. The micro switches are not closed simultaneously but are so arranged that the switch 63 is first closed by one of the arms 62 and then upon the next movement of the shaft 42 the switch 63 is released and the other arm 62 closes the switch 64. The purpose of this switch operation will be hereafter described.

The program board 65 (Figs. 1 and 7) has a series of spaced pairs of sockets 66, one pair for each interval of time at which calls are to be made. The program tape 58 runs adjacent the program board and is provided with a plurality of lugs 67 projecting from its outer face. There is a circuit closer 68 provided for each pair of sockets 66. Each circuit closer comprises a pair of flexible contact members normally separated but moved into circuit closing contact when engaged by a lug 67 as it advances in its step by step movement.

Plugs are provided each having a double pointed circuit closing prong 71 insertable into any of the pairs of sockets 66 to close the circuit between the wires 72 and 73 at predetermined times. The wire 72 is connected to one of each pair of sockets 66 and the wire 73 is connected to one of the contact members of each circuit closer 68. The other contact member 68 of each pair is connected to the other socket of a corresponding pair 66 so that when a plug 71 is inserted into a pair of sockets 66 and the corresponding circuit closer 68 is closed by a lug 67 a circuit is completed through the wires 72 and 73.

*Operation*

To begin, it will be understood that this call system is operated in connection with a conventional telephone system having a call bell and a receiver-transmitter unit commonly called a "receiver" and the telephone has a source of electric power for the bell circuit, usually 48 v. and another source of electric power for the talking circuit, usually 20 v., and these same power sources are used for their respective purposes when the call system is in operation, the electric power of the call system being used merely to switch on and off the various call system circuits. Lifting the receiver in the telephone system when the bell is ringing disconnects the bell circuit and closes the talking circuit and the same actions occur when the call system is connected with the telephone system.

The bell ringing circuit is carried by the wires 75 and 76 and the talking circuit is carried by the wires 76 and 77, the wire 76 being split into the wires 76$^a$ and 76$^b$ to serve both the ringing and talking circuits.

If an individual call circuit is to be provided for each telephone station, then the three wires 75, 76, and 77 will be connected directly to the telephone system. However, it is known that in large installations such as a hotel having many rooms with a telephone in each room, only a fraction of the rooms will desire call service in any one period. Therefore, for economy a relatively small number of call circuits are provided and each has the three wires 75, 76, and 77 running through a cord 78 having a plug 79 to which said three wires are connected. A room plug board 80 is provided having a socket 81 for each room and the sockets are connected to the telephone system of their respective rooms by the wires 75, 76, and 77. The sockets 81 and plugs 79 are the same as those used on a conventional telephone switchboard. With this arrangement a call circuit may be connected with any desired room and set to ring the telephone bell in that room at the desired time.

The magnet 12 of the safety switch is energized each minute by the clock circuit closer 3. The circuit for this is carried from the rectifier 5 over the 24 v. wire 82, through the circuit closer 3, the wire 84 to the magnet 12, and over the wire 85 back to the rectifier 5.

The magnet 44 is energized each minute by the clock circuit closer 3 by the 24 v. circuit over the wire 82, to the circuit closer 3, the wire 86 to the magnet 44, the wires 87 and 85 back to the rectifier 5.

Assuming that the call system parts are in normal neutral position as in Fig. 1 and the wires 75, 76, and 77 are connected to the telephone system of a room, either directly or through the cord 78 and plug 79 in a socket 81, the system is set to make a call, that is, to ring the telephone bell, by inserting the plug 71 into a pair of sockets 66 on the program plug board designated for the time desired, such call times being at half hour intervals or at such other intervals for which the system may be constructed.

The magnet 44 will be energized and move the armature 45 each minute which will rotate the disk 43 one step and the cam 52 will also rotate step by step and when the rider 54 drops off a riser 53 the program tape 58 will advance one step and the lug 67 thereon will close one of the circuit closers 68 but unless the plug 71 has been inserted in the corresponding sockets 66 no electric circuit will be completed.

Now when the lug 67 closes the circuit closer 68 for which the plug 71 has been inserted in the corresponding sockets 66, a circuit will be closed between the wires 72 and 73. When this occurs, the 24 v. circuit is carried by wires 85 and 72 through program board, on wire 73 to micro switch 63, on wire 88 to lower latch relay magnet 18, on wires 89 and 86 to clock circuit closer 3 and on wire 82 back to power source. During this momentary power impulse an arm 62 has advanced one step and momentarily closed the micro switch 63.

Energizing the lower latch relay magnet 18 has attracted the armature 20 and closed the circuit between the contacts 23 and 24 which closes the bell ringing circuit which is over the wire 75 to the safety switch points 8 and 9 and the blade 10, the wire 90 through the contacts 23 and 24 and blade 25, wire 91 to upper latch relay magnet 17 and over wire 76$^a$ completing the bell ringing circuit.

It is presumed that the person in the room being called will promtly lift the telephone receiver which will break the bell circuit as follows: It will be noted that the bell ringing circuit, which is the 110 v.—20 c. circuit provided by the telephone system, includes both the bell magnet of said system and the upper latch relay magnet 17 in series. This reduces the power of the current which is sufficient to ring the bell but not strong enough to operate the magnet 17 when in such series. Lifting the telephone receiver shunts the circuit around the bell magnet and sends all of the power through the magnet 17 which will then attract the armature 19, pulling its lower end off the step 26 so that the spring 27 can move the armature 20 and the blade 25 to close the circuit between the contacts 21 and 22. This closes the talking circuit which is over the wires 77, the contacts 22 and 21 and blade 25 and the wires 76$^b$ and 76.

If the receiver is not lifted to stop ringing the bell before the minute interval when the next impulse caused by closing the clock switch 3, then said impulse will rotate the shaft 42 and arms 62 thereon to close the circuit through the micro switch 64. This closes the circuit from the 24 v. power wire 85 over wire 92, through micro switch 64, over wire 93 through latch relay magnet 32, over wire 94 through contacts 23 and 24 and blade 25, over wire 95 through contacts 6 and 7 and blade 10 of safety switch which has been momentarily lifted by the same impulse, and over wire 96 to wire 82 of the power line.

This circuit energizes the magnet 32 and attracts the armature 33 which moves the blade 31 into contact with the points 29 and 30 closing the circuit over the wires 97 and 98 and latches it closed. The circuit over the wires 97 and 98 connects with the 110 v. line wires 2, there being a light 99 and buzzer 100 shown in parallel in this circuit. Operation of the light shows which station did not answer the call and operation of the buzzer calls attention of the operator to the fact that the call bell has not been stopped within the one minute duration. To put the system back in neutral condition, an operator pushes a circuit closing button 101 in the wire 102 which connects with the power wire 82 and the throw out magnet 36, the circuit being completed by a wire connecting the power wire 85 with the magnet 36.

Energizing the magnet 36 attracts the armature 37 to which is attached the cross bar 38 overlapping both armatures 19 and 35 and moves these armatures to unlatched position whereat they move to open the circuits between the contacts 23 and 24 of the bell ringing relay and the contacts 29 and 30 of the buzzer and light relay, putting the call system back into neutral position.

It will be noted that the 110 v.—20 c. bell ringing circuit and the 24 v. program circuit both pass over the contacts 23 and 24 and blade 25 of the bell ringing relay but they cannot be permitted to do this at the same time. Therefore, the bell ringing circuit passing over the wires 75 and 90 are connected with the contacts 8 and 9 of the safety switch and only carry current when the magnet 12 is deenergized, while the program circuit passing in part over the wires 95 and 96 which are connected to the contacts 6 and 7 and only carry current when the magnet 12 is energized.

The invention is defined by the appended claims which are to be considered comprehensive of all forms coming within their scope.

I claim:

1. The combination with a conventional telephone system having a talking circuit, a bell circuit and a receiver actuated switch acting to close the bell circuit when the receiver is at rest and to break the bell circuit when lifted, of an automatic call system connected with said telephone system comprising a second switch for automatically energizing said bell circuit to cause ringing of the bell at a predetermined time and at the same time breaking said talking circuit, and automatic means actuated by lifting said receiver acting to break said bell circuit and close said talking circuit.

2. The elements of claim 1 in which said conventional telephone system includes an electric power source for said talking circuit and a separate electric power source for said bell ringing circuit and said call system acts to break or close said telephone talking and bell circuits.

3. The elements of claim 1 combined with means to indicate operation of the bell longer than a predetermined period and manually controlled means acting to cause the call system to break the bell circuit and close the talking circuit without lifting said receiver.

4. The combination with a conventional telephone system having a talking circuit, a bell circuit and a receiver acting to close the bell circuit and break the talking circuit when at rest and to break the bell circuit and close the talking circuit when lifted, of an automatic call system connected with said telephone system including a relay switch connected in both said talking circuit and said bell circuit and automatic means for throwing said relay switch at a predetermined time to close said bell circuit when the receiver is at rest and at the same time to break said talking circuit and electric means actuated by lifting said receiver to throw said relay switch to break said bell circuit and close said talking circuit.

5. The elements of claim 4 in which said relay switch is a latch switch having means for latching said relay switch in either of its thrown positions, said latching means being released from either of its positions by throwing the switch to its other position.

6. The elements of claim 4 combined with means for manually breaking said bell circuit and closing said talking circuit without lifting said receiver.

7. The elements of claim 6 combined with means for automatically actuating a signal after said bell circuit has been closed for a predetermined time.

8. The combination with a plurality of telephone systems each having a talking circuit, a bell circuit and a receiver actuated switch acting to close said bell circuit when at rest and to break the bell circuit when lifted, of an automatic call system having means for selectively connecting it with any one of said plurality of telephone systems and comprising means for automatically energising said bell circuit to cause ringing of said bell at a predetermined time and at the same time breaking said talking circuit, and automatic means for breaking said bell circuit and closing said talking circuit actuated by lifting said receiver.

9. The elements of claim 8 in combination in which said means for selective connection comprises a plug board adjacent said call system, said plug board having a plurality of sockets each being electrically connected to a respective telephone system, a plug adapted to be inserted into any one of said sockets to make electrical connection therewith and flexible electric wiring having electric connection with said plug and said call system.

References Cited in the file of this patent

UNITED STATES PATENTS

| | | |
|---|---|---|
| 1,295,096 | Andersen | Feb. 25, 1919 |
| 1,302,767 | Clausen et al. | May 16, 1919 |

FOREIGN PATENTS

| | | |
|---|---|---|
| 577,258 | Great Britain | May 10, 1946 |